(12) United States Patent
Mayer et al.

(10) Patent No.: US 7,481,417 B2
(45) Date of Patent: Jan. 27, 2009

(54) VACUUM VALVE

(75) Inventors: Thomas Mayer, Hohenems (AT); Bernhard Duelli, Uebersaxen (AT)

(73) Assignee: VAT Holding AG, Haag (CH)

( * ) Notice: Subject to any disclaimer, the term of this patent is extended or adjusted under 35 U.S.C. 154(b) by 550 days.

(21) Appl. No.: 11/347,163

(22) Filed: Feb. 2, 2006

(65) Prior Publication Data
US 2006/0169940 A1   Aug. 3, 2006

(30) Foreign Application Priority Data
Feb. 2, 2005   (DE)   ........................ 10 2005 004 987

(51) Int. Cl.
*F16K 31/383* (2006.01)
*F16J 3/00* (2006.01)

(52) U.S. Cl. .................... 251/158; 251/334; 251/356

(58) Field of Classification Search ................ 251/266, 251/335.3, 357, 358, 332, 333, 334, 14, 63.6, 251/158
See application file for complete search history.

(56) References Cited

U.S. PATENT DOCUMENTS

| | | | | |
|---|---|---|---|---|
| 158,389 | A | * | 1/1875 | Parsons ................. 137/505.25 |
| 653,600 | A | * | 7/1900 | Wiley ........................... 251/158 |
| 709,102 | A | * | 9/1902 | Martin et al. ................ 251/158 |
| 989,202 | A | * | 4/1911 | Snow ........................... 251/158 |
| 1,082,508 | A | * | 12/1913 | Elwell ...................... 137/514.7 |
| 1,738,014 | A | * | 12/1929 | Murray et al. ............... 251/158 |
| 1,836,068 | A | * | 12/1931 | Goldsberry ............ 137/516.29 |
| 2,163,472 | A | * | 6/1939 | Shimer .................. 137/516.29 |
| 2,273,693 | A | * | 2/1942 | Burks ..................... 137/533.23 |
| 2,687,276 | A | * | 8/1954 | Hornsby ..................... 251/113 |
| 2,952,269 | A | * | 9/1960 | Stehlin ........................ 137/270 |
| 3,108,780 | A | * | 10/1963 | Wishart ....................... 251/334 |
| 4,052,036 | A | | 10/1977 | Schertler |
| 4,346,870 | A | * | 8/1982 | Chute et al. .................. 251/356 |
| 4,458,905 | A | | 7/1984 | Boesch |
| 4,470,576 | A | | 9/1984 | Schertler |

(Continued)

FOREIGN PATENT DOCUMENTS

AT            396 285           7/1993

(Continued)

*Primary Examiner*—John Rivell
*Assistant Examiner*—Cloud K Lee
(74) *Attorney, Agent, or Firm*—Reed Smith LLP

(57) ABSTRACT

A vacuum valve comprises a conical sealing surface arranged at a valve body, a valve disk at which a conical sealing surface is arranged, and a sealing ring having a first sealing surface and a second sealing surface. The valve disk, the valve body and the sealing ring are made of metal at least in the areas of the sealing surfaces. The valve disk is constructed so as to be curved or angled considered in axial section through the center and encloses an angle of less than 90° with the closing direction in the unloaded state at least in a radial outer portion adjoining the sealing surface. The valve disk has an elasticity such that a displacement of the radial outer edge of the valve disk relative to a point in the center of the valve disk of at least 0.1% of the diameter of the valve disk in direction of the center axis of the valve disk is bought about in the closed position of the valve disk relative to the open position of the valve disk by an elastic deformation of the valve disk.

19 Claims, 7 Drawing Sheets

U.S. PATENT DOCUMENTS

| | | | |
|---|---|---|---|
| 4,475,711 A * | 10/1984 | Rountry | 251/85 |
| 4,560,141 A | 12/1985 | Boesch | |
| 4,815,706 A * | 3/1989 | Feuling | 251/356 |
| 5,318,274 A | 6/1994 | Tinner | |
| 6,478,043 B2 * | 11/2002 | Ishigaki | 137/341 |
| 6,491,059 B2 * | 12/2002 | Kajitani | 137/530 |
| 7,328,881 B2 * | 2/2008 | Sakurai et al. | 251/63.6 |
| 2002/0027211 A1 * | 3/2002 | Kajitani | 251/63.6 |
| 2002/0033461 A1 * | 3/2002 | Kajitani | 251/63.6 |
| 2003/0230192 A1 * | 12/2003 | Ohrle et al. | 92/103 F |
| 2004/0007682 A1 * | 1/2004 | Kajitani | 251/63.6 |

FOREIGN PATENT DOCUMENTS

| | | |
|---|---|---|
| DE | 25 23 152 | 11/1976 |
| DE | 26 23 906 | 12/1977 |
| DE | 31 30 651 | 2/1983 |
| DE | 41 35 566 | 5/1993 |
| DE | 44 46 947 | 7/1996 |
| JP | 2001-82632 | 3/2001 |
| WO | WO 93/01437 | 1/1993 |

* cited by examiner

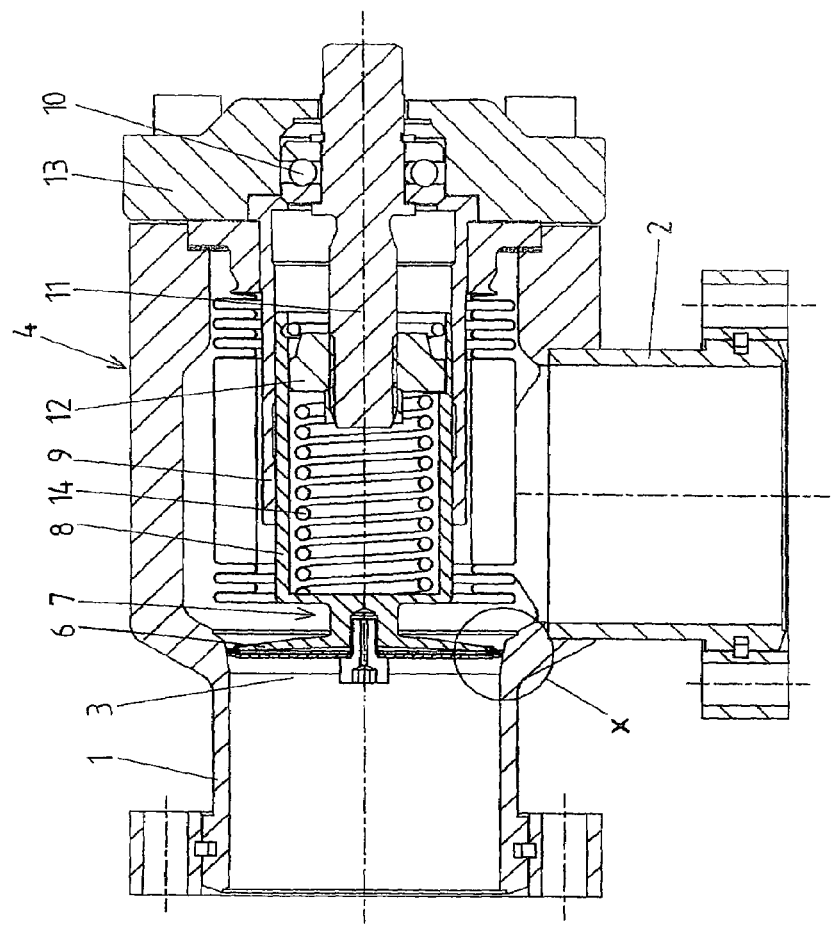
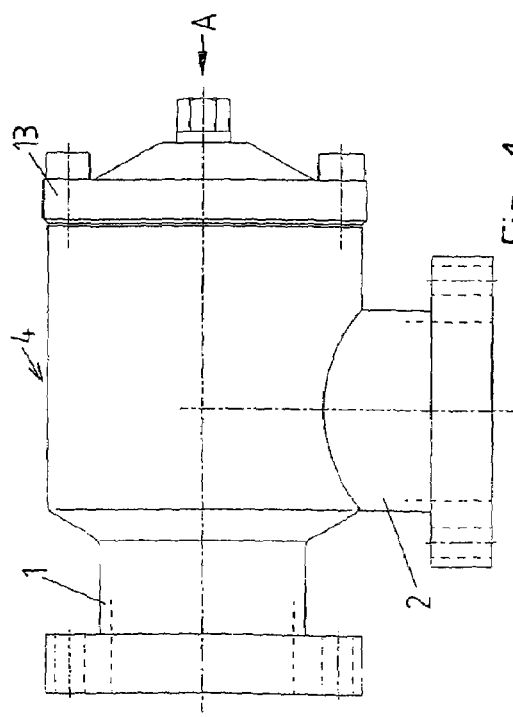
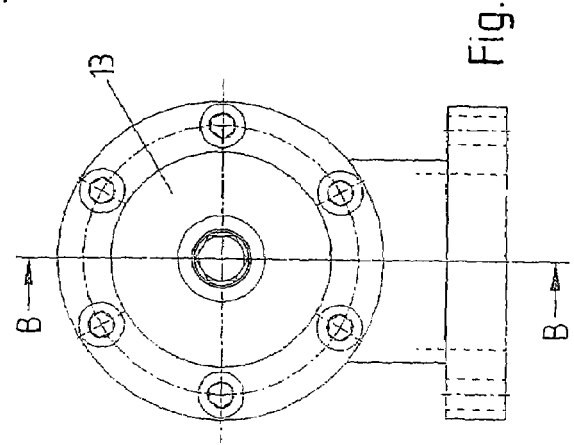

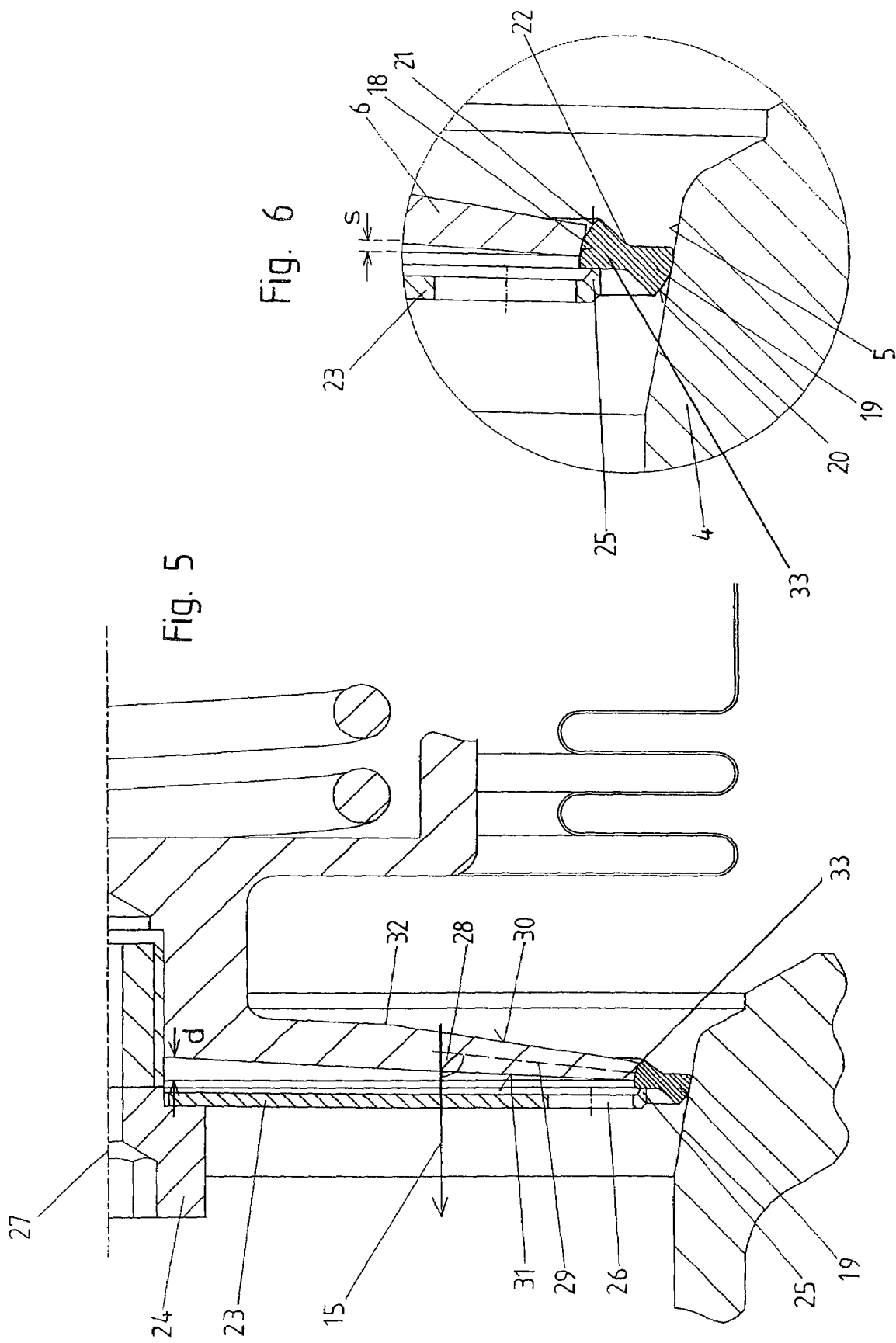

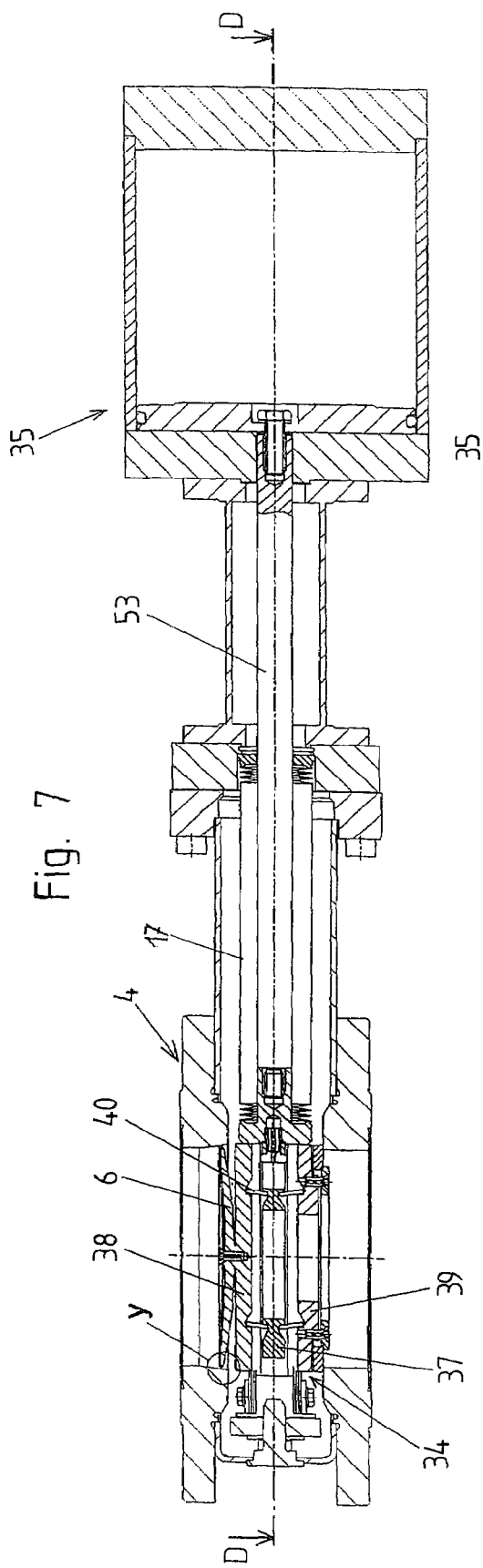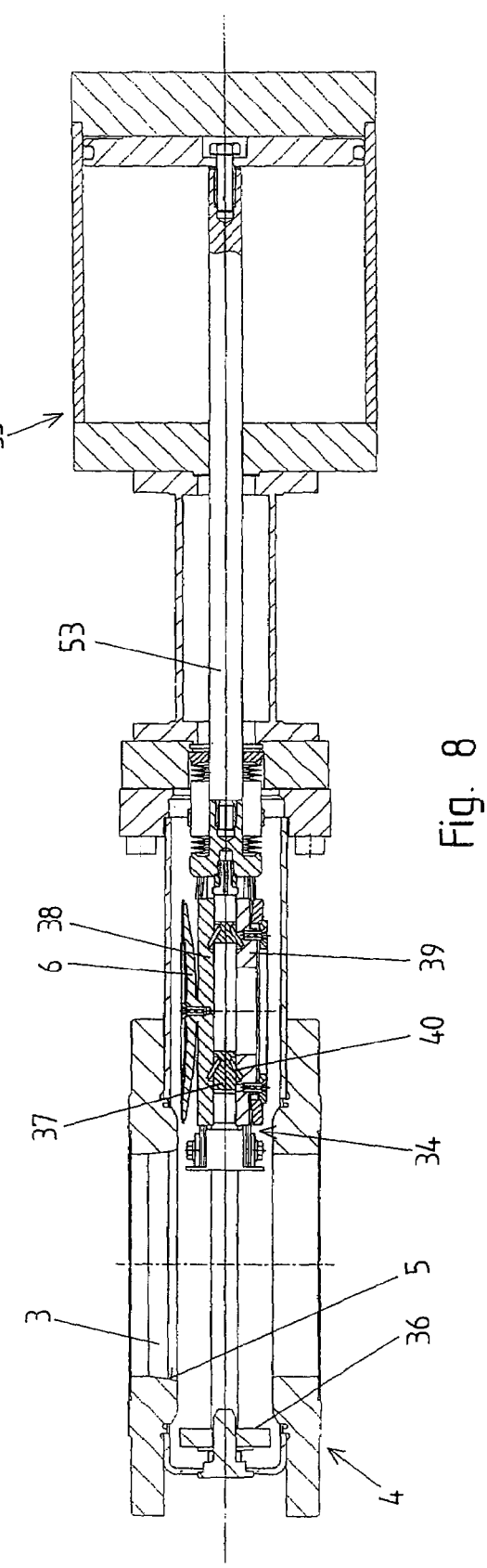

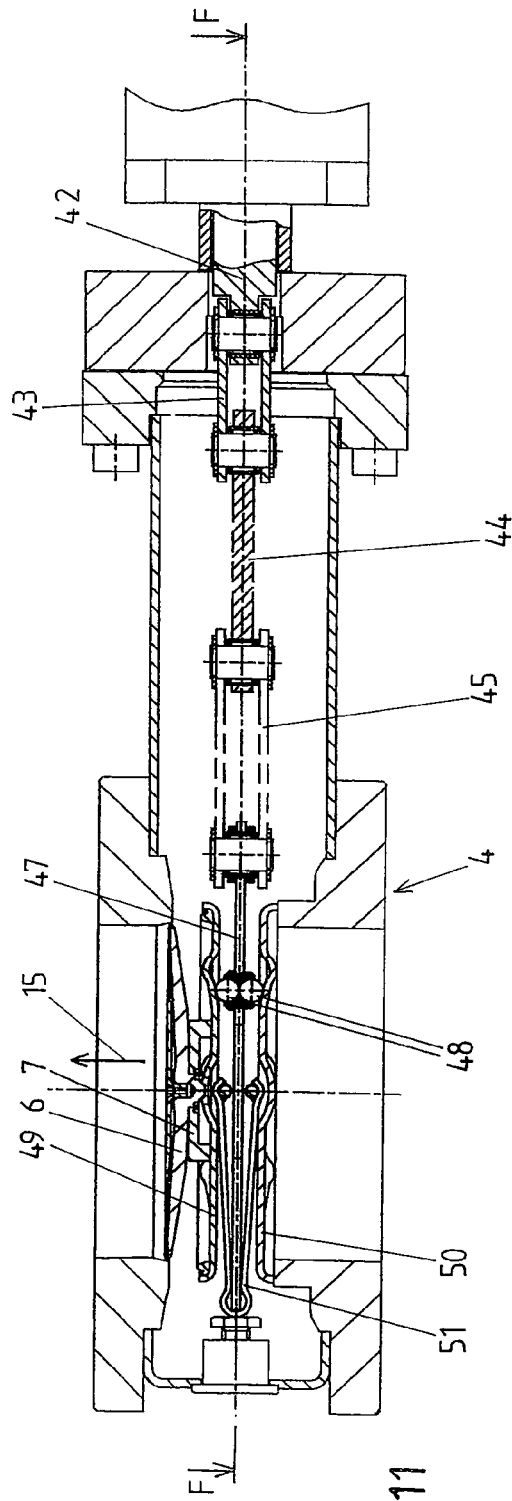
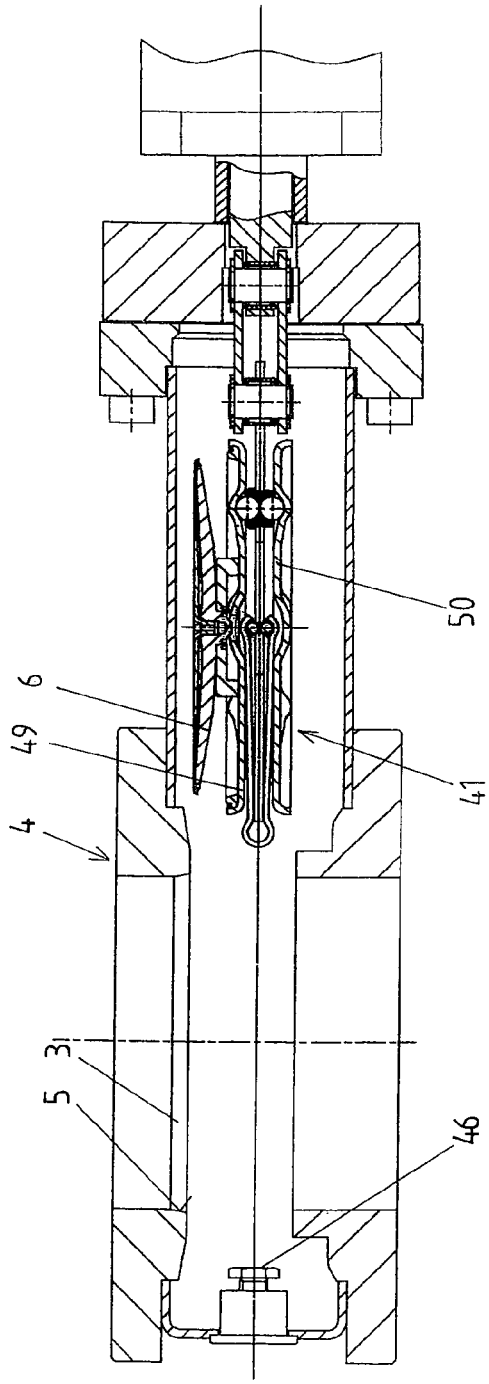
Fig. 11
Fig. 12

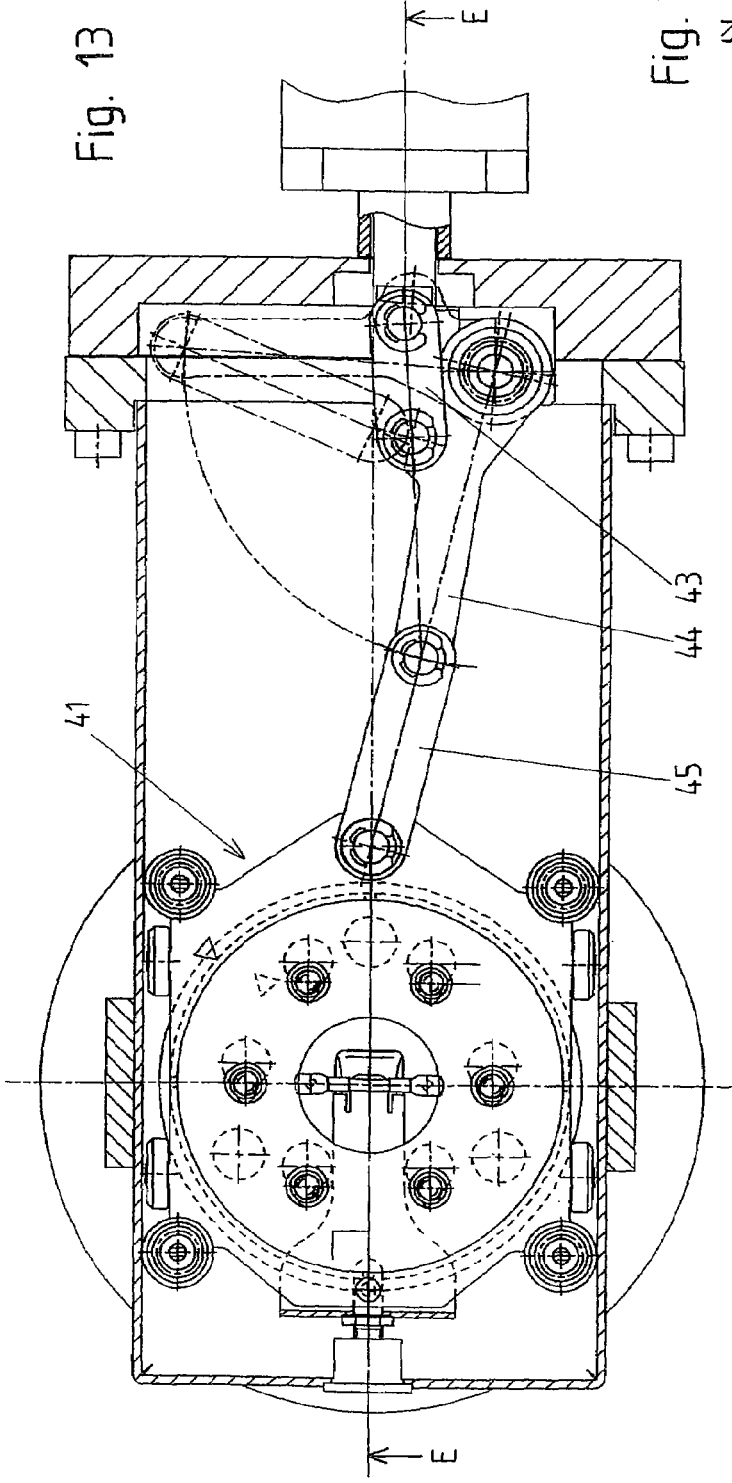
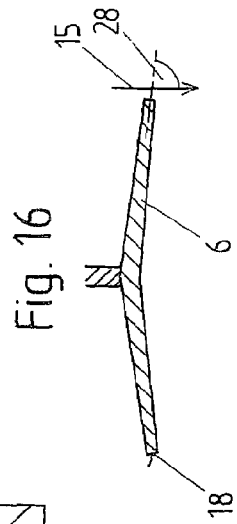
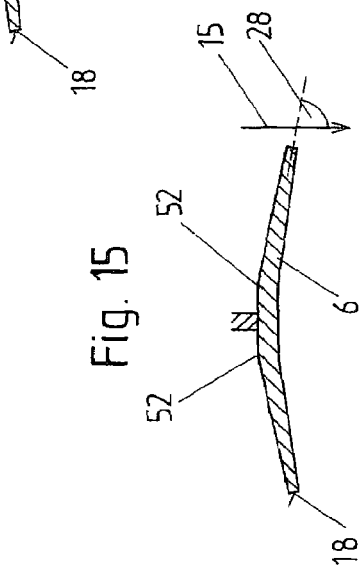
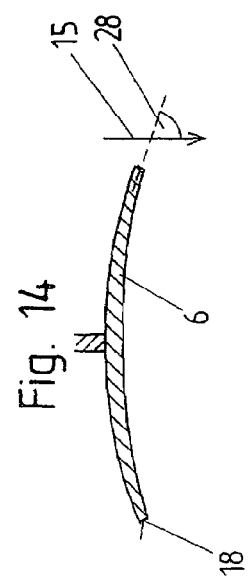

VACUUM VALVE

CROSS-REFERENCE TO RELATED APPLICATION

This application claims priority of German Application No. 10 2005 004 987.7, filed Feb. 2, 2005, the complete disclosure of which is hereby incorporated by reference.

BACKGROUND OF THE INVENTION a) Field of the Invention

The invention is directed to a vacuum valve with a conical sealing surface which is arranged at a valve body and which surrounds a valve opening, a valve disk which is rotationally symmetrical with respect to its center axis and at which a conical sealing surface is arranged and which is displaceable between an open position in the open state of the vacuum valve and a closed position in the sealed state of the vacuum valve, the movement of the valve disk when closing the vacuum valve taking place, at least in a final part of the closing movement before reaching the closed position, in a closing direction extending parallel to the center axis of the valve disk, and with a sealing ring having a first sealing surface and a second sealing surface which are pressed against the sealing surface of the valve body on one side and against the sealing surface of the valve disk on the other side in the closed position of the valve disk. The valve disk, the valve body and the sealing ring are made of metal at least in the areas of the sealing surfaces.

b) Description of the Related Art

A vacuum valve of the type mentioned above which is constructed as an all-metal valve is known from U.S. Pat. No. 4,458,905. This is a proven construction that is used particularly for high-vacuum applications. However, a disadvantage of this vacuum valve consists in that the force to be applied for tightly closing the valve (closing force) is relative large.

Another vacuum valve of this type is known from DE 44 46 947 C2. In order to reduce the required closing force, the sealing ring in this vacuum valve has a necked-down portion which is located in the area between the two sealing surfaces and which is formed by a V-shaped construction (with an opening angle greater than 90°) of the two side surfaces which connect the sealing surfaces. While this reduces the required closing force, this closing force is still relatively large.

DE 26 23 906 A1 discloses a vacuum valve in which the valve disk is provided with an annular disk that projects outward. The outward circumferential narrow side of the disk is rounded and forms a sealing surface. The disk is constructed so as to be flexible in the manner of a disk spring and extends forward diagonally (with reference to the closing direction), i.e., viewed in longitudinal section, it encloses an angle of less than 90° with the closing direction of the valve disk. The outer sealing surface of this disk cooperates with a conical sealing surface at the valve body. A disadvantage of this valve consists in that a deficient tightness of the valve can result even with very close tolerances of the geometry of the disk and sealing surface of the valve body, for example, roundness defects. Also, snap effects can occur when the valve is opened, particularly when the valve has been heated. For this reason, this vacuum valve has not had practical success.

Further, AT 396 285 B discloses a vacuum valve in which an actuation member which is constructed in the manner of an expanding cone cooperates with a saucer-type closure member. For this purpose, a ring disk is constructed integral with the saucer-type closure member. When the actuation member moves in, the ring disk which is constructed in the manner of a disk spring forms a spreading element which presses the saucer-type closure member outward so that an outer sealing edge of the saucer-type closure member is pressed against a conical sealing surface of the valve body in order to seal the vacuum valve. This vacuum valve requires a relatively large force for closing tightly. Further, relatively slight geometric inaccuracies in this vacuum valve lead to deficient tightness of the valve.

OBJECT AND SUMMARY OF THE INVENTION

One object of the invention to provide an improved vacuum valve of the type mentioned in the beginning which requires a small closing force. According to the invention, this object is met by a vacuum valve with a valve body at which a conical sealing surface is arranged so as to surround a valve opening, a valve disk which is rotationally symmetrical with respect to its center axis and at which a conical sealing surface is arranged and which is displaceable between an open position in the open state of the vacuum valve and a closed position in the sealed state of the vacuum valve, the movement of the valve disk when closing the vacuum valve taking place, at least in a final part of the closing movement before reaching the closed position, in a closing direction extending parallel to the center axis of the valve disk, and with a sealing ring having a first sealing surface and a second sealing surface which are pressed against the sealing surface of the valve body on one side and against the sealing surface of the valve disk on the other side in the closed position of the valve disk, wherein the valve disk, the valve body and the sealing ring are made of metal at least in the areas of the sealing surfaces, and the valve disk is constructed so as to be curved or angled considered in an axial section through the center and, in this respect, encloses an angle of less than 90° with the closing direction in the unloaded state at least in a radial outer portion adjoining the sealing surface, and the valve disk has an elasticity such that a displacement of the radial outer edge of the valve disk relative to a point in the center of the valve disk of at least 0.1% of the diameter of the valve disk in direction of the center axis of the valve disk is bought about in the closed position of the valve disk relative to the open position of the valve disk by means of an elastic deformation of the valve disk.

It has been shown that the force required for tightly closing the vacuum valve can be reduced by the construction of the valve disk according to the invention compared to a conventional rigid, plane valve disk known, e.g., from U.S. Pat. No. 4,458,905 B or DE 44 46 947 C2. In an embodiment of the invention, the required closing force can be reduced by half.

The reduction in the closing force required to seal the vacuum valve is attributable particularly to a force component of the valve disk acting radially outward in its closed position.

A more uniform distribution of force can also be achieved by the inventive construction of the valve disk with an elasticity in case of deviations in roundness of the sealing surface of the valve disk or of the sealing surface of the valve body or of the sealing surfaces of the sealing ring.

In order to achieve a favorable elasticity curve of the valve disk, the thickness of the valve disk preferably decreases toward the radial outer edge of the valve disk.

In a possible embodiment form, the valve disk is continuously curved considered in axial section through the center; that is, the valve disk is curved or convex/concave in its entirety. In other embodiment forms of the invention, the valve disk can be V-shaped (with an opening angle greater than 90°) or has at least two portions adjoining one another in radial direction which are connected to one another via a curve or angle.

A vacuum valve according to the invention can be constructed, for example, as a corner valve. In this case, the entire closing movement of the valve disk is carried out in the closing direction parallel to the center axis of the valve disk. Also, a vacuum valve according to the invention can be constructed in the form of a slide valve in which the closing movement of the valve disk is carried out initially perpendicular to the center axis of the valve disk proceeding from the open position of the valve disk. The final part of the closing movement which is carried out in the closing direction parallel to the center axis of the valve disk can be caused, for example, by an expansion mechanism or spreading mechanism. Slide valves are this type are known, for example, from U.S. Pat. Nos. 4,560,141 B, 4,052,036 B and 4,470,576 B. There are also other known types of adjusting devices for the valve disk for achieving a movement of the valve disk that is carried out in direction parallel to the center axis of the valve disk at least in the final part of the closing movement before reaching the closed position of the valve disk.

A vacuum valve according to the invention can be constructed with different geometries and with different adjusting devices when there is a closing direction extending parallel to the center axis of the valve disk, around which this valve disk is constructed so as to be symmetric with respect to rotation, at least in the final part of the closing movement when closing the valve.

Further advantages and details of the invention are described in the following with reference to the accompanying drawings which also indicate further objects of the invention.

BRIEF DESCRIPTION OF THE DRAWINGS

In the drawings:

FIG. 1 is a side view of a vacuum valve according to the invention which is constructed as a corner valve;

FIG. 2 is a front view of the valve from FIG. 1 (viewing direction A in FIG. 1);

FIG. 3 shows a section along line B-B in FIG. 2 in the closed, sealed state of the valve;

FIG. 5 shows an enlarged section from FIG. 4 in the region of the valve disk;

FIG. 6 shows a further enlarged section from FIG. 5 in the region of the sealing ring (detail X from FIG. 3);

FIG. 7 shows a section through a valve according to another embodiment form of the invention (section line C-C from FIG. 9) in the closed state of the valve;

FIG. 8 shows a section corresponding to FIG. 7 in the open state of the valve;

FIG. 11 shows a section through another embodiment example according to the invention (section line E-E from FIG. 13) in the closed state of the valve;

FIG. 12 shows a section corresponding to FIG. 11 in the open state of the valve;

FIG. 13 shows a section along line F-F from FIG. 11; and

FIG. 14 to FIG. 16 shows schematic views of other embodiment forms of valve disks of the valves according to the invention (in axial section through the center).

DESCRIPTION OF THE PREFERRED EMBODIMENT EXAMPLES

Figure 4:
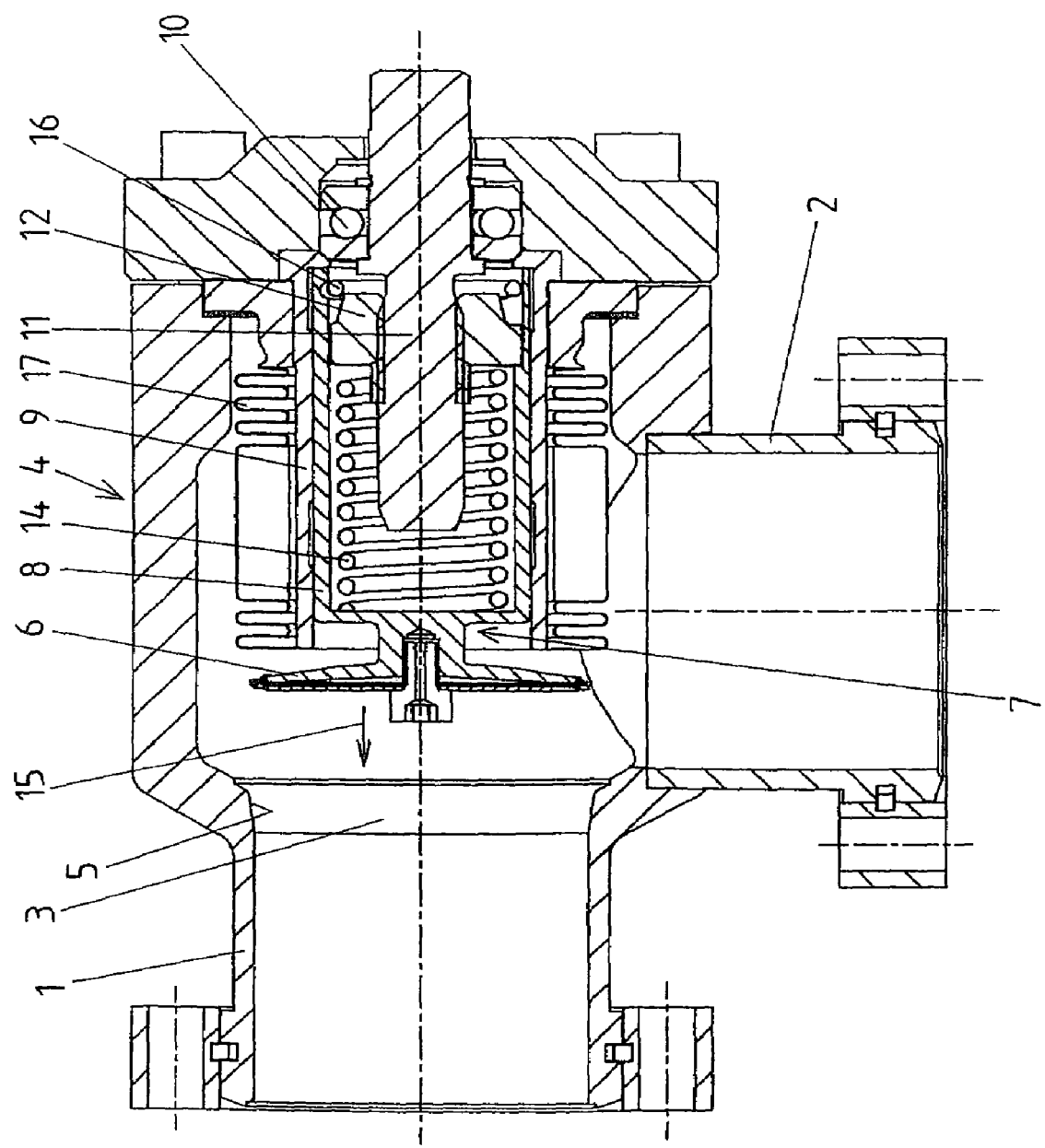
FIG. 4 shows a section corresponding to FIG. 3, but in the open state of the valve.

In the embodiment form of the invention shown in FIGS. 1 to 6, the vacuum valve is constructed as a corner valve in which the connection pieces 1, 2 extend at an angle, preferably at a right angle, to one another. The valve opening 3 is surrounded by a sealing surface 5 which is arranged at the valve body 4. The valve body 4, in its entirety, forms the housing of the vacuum valve.

A valve disk 6 can be displaced between an open position (FIG. 4) and a closed position (FIGS. 3, 5 and 6) in the sealed state of the vacuum valve. For this purpose, the valve disk 6 is arranged in the region of its center axis at a supporting part 7. In this embodiment example, this supporting part 7 is connected to a widened cup-shaped portion 8. The cup-shaped portion 8 is guided in a guide sleeve 9 so as to be axially displaceable. A spindle 11 which is rotatably mounted by means of a ball bearing 10 and on which a spindle nut 12 is arranged is used for axial displacement. The spindle nut 12 lies within the cup-shaped portion 8 and is secured with respect to rotation relative to it. The cup-shaped portion 8 is likewise secured with respect to rotation relative to the guide sleeve 9.

The spindle 11 exits from the housing of the vacuum valve through the housing cover 13. A pressure spring 14 constructed as a coil spring is arranged between the spindle nut 12 and the base of the cup-shaped portion 8.

In order to close the vacuum valve proceeding from its open state (FIG. 4), the spindle 11 is rotated (e.g., with an open-end wrench or a torque wrench) so that the spindle nut 12 on the spindle 11 is displaced toward the free end of the spindle 11. This displacement is transmitted via the pressure spring 14 to the cup-shaped portion 8 which accordingly moves along with the valve disk 6 in the closing direction 15 until the closed position of the valve disk 6 is reached (FIG. 3) and the vacuum valve is sealed. To open the vacuum valve, the spindle 11 is turned in the opposite direction so that the spindle nut 12 moves against a stop of the cup-shaped portion 8 which is formed by a spring ring 16 and, as a result, pulls back the cup-shaped portion 8 together with the valve disk 6 opposite to the closing direction 15.

This drive mechanism for a corner valve is known. The drive mechanism for adjusting the valve disk 6 between its open position and its closed position could also be constructed in a different way. In a corner valve, the movement of the valve disk between the open position and the closed position is usually carried out in a straight line in the closing direction and opposite thereto, respectively.

In principle, the valve disk 6 could be formed integral with the supporting part 7 as is shown schematically in FIGS. 3 to 5. On the other hand, the valve disk 6 and the supporting part 7 could be separate parts which are connected to one another. As is shown schematically in FIGS. 3 to 5, the supporting part 7 and the cup-shaped portion 8 can be constructed integral with one another or as separate parts that are connected to one another (e.g., by a screw connection).

Bellows 17 which are shown only schematically serve to seal the closing mechanism as is likewise known and common.

The sealing surface 5 which is arranged at the valve body 4 is conical, its diameter decreasing in the closing direction 15. Another conical sealing surface 18 whose diameter likewise decreases in closing direction 15 is arranged at the radial outer narrow side of the valve disk 6.

The angle of conicity of the sealing surfaces 5, 18 can be in the range of 10° (+/−5°).

Further, a sealing ring 19 having a first sealing surface 20 and second sealing surface 21 is provided for sealing the vacuum valve. As can be seen most clearly from FIG. 6, these sealing surfaces 20, 21 extend along a circular arc in cross section of the sealing ring.

In the sealed state of the vacuum valve, when the valve disk 6 is in its closed position, the first sealing surface 20 is pressed against the sealing surface 5 of the valve body 4 and the second sealing surface 21 is pressed against the sealing surface 18 of the valve disk 6.

In the region between the two sealing surfaces 20, 21, the sealing ring 19 preferably has a necked-down portion 22 which is formed by a V-shaped construction of the two side surfaces of the sealing ring 19 connecting the sealing surfaces 20, 21 (the opening angle of these V-shaped constructions is greater than 90°, preferably greater than 120°). The elasticity of the sealing ring is increased by means of this reduced thickness of the sealing ring in the region between the two sealing surfaces 20, 21. As a result, a smaller closing force is required to seal the vacuum valve.

The radii of the first and second sealing surfaces 20, 21 can be between 0.5 mm and 2 mm, for example. The sealing ring 19 can be constructed in particular by milling a round wire of suitable diameter, e.g., 2 mm.

The conical shape of the sealing surfaces 5, 18 and the construction of the sealing ring 19 are likewise already known, for example, from the above-cited DE 44 46 947 C2.

In the embodiment example, the sealing ring 19 is held at the valve disk 6, i.e., when the valve disk 6 is adjusted to its open position, the sealing ring 19 moves along with the valve disk. For this purpose, in the present embodiment example, a holding plate 23 is fastened to the front of the valve disk 6 remote of the supporting part 7, namely, by means of a screw bolt 24 which penetrates a central bore hole in the holding plate 23 and is screwed into a threaded bore hole. This threaded bore hole extends through the center of the valve disk 6 and extends up to the supporting part 7.

The holding plate 23 has a peripheral web 25 that is angled in direction of the sealing ring 19 and whose end face contacts the sealing ring 19. Further, venting holes 26 are arranged in the holding plate 23.

In principle, it would also be conceivable and possible, although less preferable, to provide the sealing ring 19 with a holder which holds it at the sealing surface 5 of the valve body 4. During the movement of the valve disk 6 into its open position, the sealing ring 19 remains in contact with the sealing surface 5 of the valve body 4. Holders of this kind are shown, for example, in the above-cited U.S. Pat. No. 4,458, 905.

The valve disk 6 is constructed so as to be rotationally symmetrical with respect to its center axis 27. Viewed in axial section through the center (FIGS. 3 to 6), the valve disk 6 is curved or angled. In this respect, it encloses an angle 28 of less than 90° (FIG. 5) with the closing direction 15 at least in an axial outer area. The recessed side of the valve disk 6 accordingly lies in the front considered in the closing direction 15. This angle 28 is referenced to the center line 29 of the valve disk 6 which extends at an equal distance from both side surfaces 30, 31 of the valve disk 6 viewed in axial section through the center. In the area of the valve disk 6 adjacent to the sealing surface 18, this angle 28 is preferably between 70° and 87°, particularly preferably between 75° and 85°. These angle specifications refer to the unloaded state of the valve disk 6. In the closed position of the valve disk 6 in which the closing force acts on the valve disk 6, a change in the angle 28 is brought about due to the elasticity of the valve disk 6, which will be described more fully in the following. This angle 28 is at most 90° in the closed position of the valve disk 6, preferably less than 90° as before.

In the embodiment example shown in FIGS. 1 to 6, the valve disk is angled in such a way that its side surface remote of the supporting part 7 is V-shaped considered in axial section through the center and is likewise V-shaped on the side surface on the supporting part 7 side, and has two portions which are separated by a bevel 32 and which have different opening angles.

Other angled constructions of the valve disk 6 are also conceivable and possible as will be described with reference to FIGS. 14 to 16. A curved construction of one or both side surfaces 30, 31 is also conceivable and possible. When both side surfaces are curved, the valve disk 6 is curved (in a concave/convex manner) in its entirety, wherein the depressed, concave side is again located in the front considered in the closing direction.

Further, the valve disk 6 is constructed with a certain elasticity. An elastic deformation of the valve disk takes place because of the closing force acting on the valve disk in the closed, sealed state of the vacuum valve. This elastic deformation is of a magnitude such that the radial outer edge 33 of the valve disk is displaced in direction of the center axis of the valve disk in the closed position of the valve disk 6 relative to the open position by a distance s with reference to a point in the center of the valve disk 6 (i.e., in the area of its center axis) which is at least 0.1% of the diameter of the valve disk. The distance s is indicated in FIG. 6. In other words, the axial distance d (see FIG. 5) of the outer edge of the valve disk relative to a point in the center of the valve disk accordingly decreases by the above-indicated amount in the closed position compared to the open position.

The distance s by which the radial outer edge of the valve disk is displaced in the closed position relative to the center region of the valve disk is preferably at least 0.5% of the diameter of the valve disk. For example, the distance s can be about 1 mm given a valve diameter of 100 mm.

The distance s of this axial displacement of the outer edge of the valve disk is preferably less than 3% of the diameter of the valve disk, particularly preferably less than 2%.

As was mentioned above, the deformation of the valve disk 6 in its closed position due to the closing force acting upon it is elastic. There is virtually no permanent plastic deformation of the valve disk 6. However, due to the relatively small extent of this deformation, the use of a spring steel is not required and is also not preferable. Rather, it is preferable to use a chromium steel such as is normally used for valve disks (without special hardening).

The thickness of the valve disk 6 preferably decreases radially outward as can be seen in FIGS. 3 to 5. Therefore, the valve disk is softer on the outer side. In particular, the thickness of the valve disk can decrease continuously radially outward at least on the radial outer side of the area in which it is connected to the supporting part 7 lying in the center of the valve disk 6.

For example, the thickness D of the valve disk in the portion adjacent to the sealing surface 18 can range from 1 mm to 4 mm, particularly preferably from 1.5 mm to 2.5 mm. The thickness in the area adjacent to the supporting part 7 depends upon the diameter of the valve disk and can be, for example, 3.5 mm when the valve disk has a diameter of 100 mm.

A favorable transmission of force to the sealing ring 19 is achieved by means of the reduction in the thickness of the valve disk toward the outer side.

With the exception of the differences described in the following, the embodiment example of the invention shown in FIGS. 7 to 10 corresponds to the embodiment example described above and the same reference numbers are used for corresponding parts.

Figure 9:
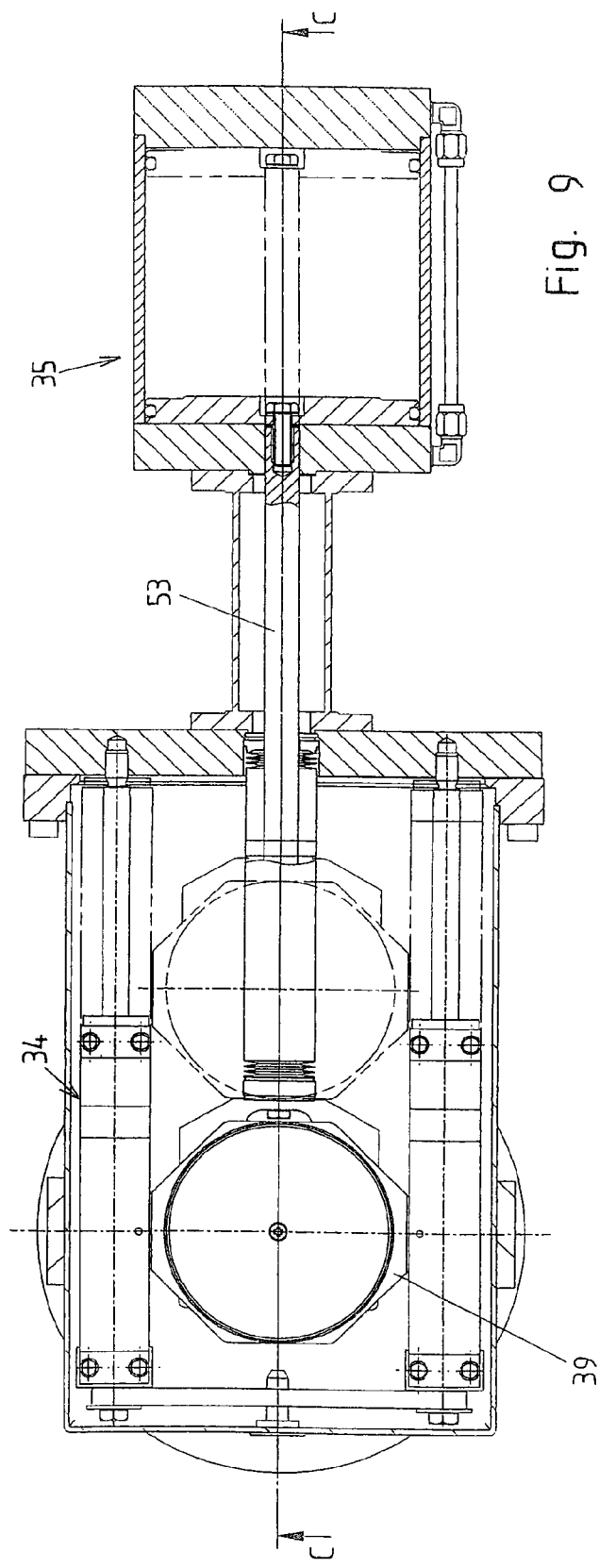
FIG. 9 shows a section along line D-D of FIG. 7.
Figure 10:
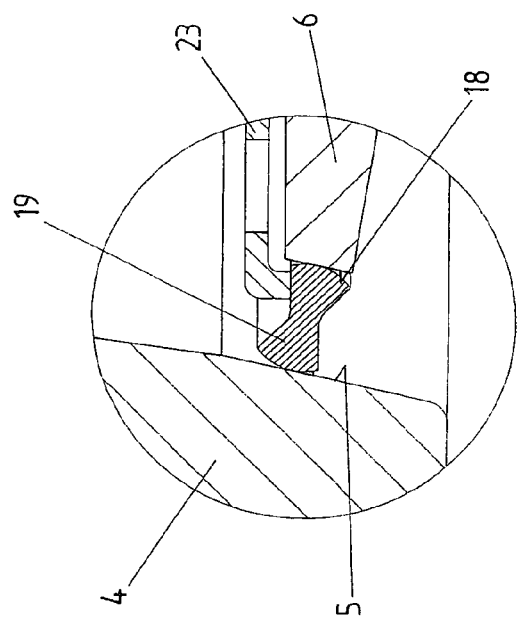
FIG. 10 shows an enlarged detail Y from FIG. 7.

In this embodiment form, the vacuum valve is constructed as a slide valve. The valve disk 6 is arranged at a spreading member 34 which is fastened to a valve rod 7. The valve rod 7 is displaceable in axial direction by means of an actuation member 35 which is constructed, for example, as a piston-cylinder unit. The open state of the vacuum valve in which the valve disk 6 is located to the side of the valve opening 3 (i.e., the open position of the valve disk 6) is shown in FIG. 8 and is indicated in FIG. 9 by dashed lines. In order to close the valve, the spreading member 34 is displaced by the valve rod 53 until the valve disk 6 is located in a position in which it overlaps the valve opening 3 but is still at a distance from the sealing surface 5 of the valve body 4 of more than the width of the sealing ring 19. In this position, the spreading member 34 contacts a stop 36 that is fixed with respect to the valve housing. The inner plate 37 at which the valve rod 53 engages is displaced relative to the outer plates 38, 39 during a further movement of the valve rod 3 (in the same direction), the outer plates 38, 39 being pressed apart against the force of a spring element by a tilting plate 40. In this way, the valve disk 6 is displaced in the closing direction 15 parallel to its center axis in direction of the sealing surface 5 of the valve body 4 until the sealed state of the valve is achieved (closed position of the valve disk 6) by the sealing surfaces 20, 21 of the sealing ring 19 pressing against the sealing surfaces 5, 18 of the valve body 4 and valve disk 6.

Slide valves with spreading members 34 of this kind are known, e.g., from the above-cited U.S. Pat. No. 4,560,141 A.

Other constructions of spreading members are also known which could be used in a valve that is constructed, according to the invention, in the form of a slide valve.

The plate 38 at which the valve disk 6 is arranged in its center area is a supporting part for the valve disk. Again, a one-piece construction or multiple-piece construction is conceivable and possible.

With the exception of the differences described in the following, the embodiment example of the invention shown in FIGS. 11 to 13 corresponds to the embodiment example described above with reference to FIGS. 1 to 6 and the same reference numbers are provided for corresponding parts.

Instead of a rigid valve rod, a lever mechanism cooperates with the spreading member 41 which is constructed as a carriage. A plate 43 is swivelably arranged at the end of a piston rod 42 of a piston-cylinder unit and is connected on the other side to a swivel lever 44. Further, a plate 45 is swivelably arranged at the swivel lever 44 and is swivelably connected to the spreading member 41 on the other side. In the closed state of the vacuum valve, the spreading member 41 is pressed against a stop 46, and outer plates 49, 50 are spread apart against the force of a spring element 51 by a central plate 47. A spreading member of this kind is known.

FIG. 13 shows the positions of the swivel lever 44 and the plate 45 in the open state of the valve.

In this construction of the vacuum valve, the valve disk 6 is also displaced in the closing direction 15 extending parallel to its center axis 27 before reaching the closed position when closing the vacuum valve.

The supporting part 7 for the valve disk 6 with which the latter is connected in its central region (in the one-piece or multiple-piece construction) is formed by a part connected to the plate 49.

Other, different constructions of closing mechanisms of a vacuum valve are conceivable and possible, wherein the valve disk 6 is displaced in a closing direction 15 extending parallel to its center axis 27 at least before reaching its closed position. The invention is not limited to a special type of closing mechanism.

Other possible embodiment forms of the valve disk are shown schematically in FIGS. 14 to 16 in axial section through the center. In the embodiment example according to FIG. 14, the valve disk 6 is constructed so as to be curved in its entirety, i.e., its two side surfaces are continuously curved. In the embodiment example according to FIG. 15, the valve disk 6 has two portions which adjoin one another in radial direction and which are connected to one another by an angle 52. In the embodiment example according to FIG. 16, the valve disk 6 is constructed in a V-shaped manner in its entirety. Combined shapes (e.g., a curved and an angled side surface) and other, different constructions of the valve disk 6 (e.g., two angled portions which are spaced apart radially at one side surface or at both side surfaces) are conceivable and possible.

An annular groove surrounding the sealing surface 5 (wherein, for example, a material thickness of between 0.5 mm and 1 mm, measured at the seal, remains between the sealing surface 5 and the groove) could also be used to impart elasticity also to the sealing surface 5 arranged at the valve body 4.

A vacuum valve according to the invention is particularly suited to high-vacuum applications.

Different modifications of the embodiment examples shown herein are conceivable and possible without departing from the framework of the invention. For example, the sealing ring 19 could also be constructed without a necked-down portion 22. However, a necked-down portion is preferable in order to achieve the smallest possible closing force of the valve.

The valve body could also be formed by the wall of a vacuum chamber which has the valve opening with the conical sealing surface surrounding it.

As follows from the preceding description, the field of the invention is not limited to the embodiment examples shown herein, but rather should be defined with reference to the appended claims together with their full range of possible equivalents.

While the preceding description and drawings show the invention, it is obvious to the person skilled in the art that various modifications can be carried out without departing from the spirit of and field of the invention.

REFERENCE NUMBERS 1 connection piece
2 connection piece
3 valve opening
4 valve body
5 sealing surface
6 valve disk
7 supporting part
8 cup-shaped portion
9 guide sleeve
10 ball bearing
11 spindle
12 spindle nut
13 housing cover
14 pressure spring
15 closing direction
16 spring ring 17 bellows
18 sealing surface
19 sealing ring
20 first sealing surface
21 second sealing surface
22 necked-down portion
23 holding plate
24 screw bolt
25 peripheral web
26 vent hole
27 center axis
28 angle
29 center line
30 side surface
31 side surface
32 bevel
33 outer edge
34 spreading member
35 actuation member
36 stop
37 plate
38 plate
39 plate
40 tilting plate
41 spreading member
42 piston rod
43 plate
44 swivel lever
45 plate
46 stop
47 plate
48 ball
49 plate
50 plate
51 spring element
52 angled portion
53 valve rod

What is claimed is:

1. A vacuum valve comprising:
a valve body at which a conical sealing surface is arranged so as to surround a valve opening;
a valve disk which is rotationally symmetrical with respect to a center axis and at which a conical sealing surface is arranged and which is displaceable between an open position in the open state of the vacuum valve and a closed position in a sealed state of the vacuum valve;
movement of the valve disk when closing the vacuum valve being carried out, at least in a final part of the closing movement before reaching the closed position, in a closing direction extending parallel to the center axis of the valve disk;
a sealing ring having a first sealing surface and a second sealing surface being pressed against the sealing surface of the valve body on one side and against the sealing surface of the valve disk on the other side in the closed position of the valve disk;
said valve disk, said valve body and said sealing ring being made of metal at least in the areas of the sealing surfaces;
said valve disk being constructed so as to be curved or angled considered in an axial section through the center and, in this respect, enclosing an angle of less than 90° with the closing direction in the unloaded state at least in a radial outer portion adjoining the sealing surface;
said valve disk having an elasticity such that a displacement of the radial outer edge of the valve disk relative to a point in the center of the valve disk of at least 0.1% of the diameter of the valve disk in direction of the center axis of the valve disk being bought about in the closed position of the valve disk relative to the open position of the valve disk by an elastic deformation of the valve disk.

2. The vacuum valve according to claim 1, wherein a displacement of the radial outer edge of the valve disk relative to the point in the center of the valve disk by at least 0.5% of the diameter of the valve disk takes place in the closed position of the valve disk compared to the open position of the valve disk.

3. The vacuum valve according to claim 1, wherein the valve disk encloses an angle (28) with the closing direction (15) in a radial outer area adjacent to the sealing surface, which angle is between 65° and 87° in the unloaded state of the valve disk.

4. The vacuum valve according to claim 3, wherein this angle is between 75° and 85°.

5. The vacuum valve according to claim 1, wherein one or both side surfaces of the valve disk is/are continuously curved considered in axial section through the center.

6. The vacuum valve according to claim 1, wherein one or both side surfaces of the valve disk is/are V-shaped.

7. The vacuum valve according to claim 1, wherein one or both side surfaces has/have two portions which adjoin one another in radial direction and which are connected to one another by a curved or angled portion.

8. The vacuum valve according to claim 1, wherein the thickness of the valve disk decreases radially outward.

9. The vacuum valve according to claim 8, wherein the thickness of the valve disk decreases continuously radially outward outside of the area in which it is connected to a supporting part.

10. The vacuum valve according to claim 1, wherein the thickness of the valve disk immediately adjacent to the sealing surface is between 1 mm and 4 mm.

11. The vacuum valve according to claim 10, wherein the thickness of the valve disk immediately adjacent to the sealing surface is between 1.5 mm and 2.5 mm.

12. The vacuum valve according to claim 1, wherein the sealing ring is held at the valve disk.

13. The vacuum valve according to claim 12, wherein a holding plate is fastened to the front side of the valve disk remote of the supporting part supporting the valve disk, which holding plate has an angled peripheral web whose end face contacts the sealing ring.

14. The vacuum valve according to claim 1, wherein the sealing surfaces of the sealing ring extend in an arc-shaped manner considered in cross section.

15. The vacuum valve according to claim 1, wherein the sealing ring has a necked-down portion in the area between the two sealing surfaces.

16. The vacuum valve according to claim 15, wherein the necked-down portion is formed by a V-shaped construction of the two side surfaces connecting the sealing surfaces.

17. The vacuum valve according to claim 1, wherein the radial outer edge of the valve disk is displaced relative to the point in the center of the valve disk by at most 3% of the diameter of the valve disk in the closed position of the valve disk compared to the open position of the valve disk by an elastic deformation of the valve disk.

18. The vacuum valve according to claim 17, wherein this displacement of the radial outer edge of the valve disk is at most 2% of the diameter of the valve disk.

19. The vacuum valve according to claim 1, wherein the radial outer portion of the valve disk adjoining the sealing surface encloses an angle of at most 90° with the closing direction in the closed position of the valve disk.

* * * * *